United States Patent
Cao (10) Patent No.: US 10,091,741 B2
(45) Date of Patent: Oct. 2, 2018

(54) POWER CONTROL METHOD AND DEVICE, AND PARAMETER TRANSMISSION METHOD

(71) Applicant: Yulong Computer Telecommunication Scientific (Shenzhen) Co., Ltd., Shenzhen, Guangdong (CN)

(72) Inventor: Yiqing Cao, Guangdong (CN)

(73) Assignee: Nanchang Coolpad Intelligent Technology Company Limited, Nanchang, Jiangxi (CN)

( * ) Notice: Subject to any disclaimer, the term of this patent is extended or adjusted under 35 U.S.C. 154(b) by 0 days.

(21) Appl. No.: 15/414,096

(22) Filed: Jan. 24, 2017

(65) Prior Publication Data

US 2017/0135048 A1 May 11, 2017

Related U.S. Application Data

(63) Continuation of application No. PCT/CN2014/083152, filed on Jul. 28, 2014.

(51) Int. Cl.
*H04W 52/24* (2009.01)
*H04W 72/04* (2009.01)
*H04W 52/38* (2009.01)

(52) U.S. Cl.
CPC ....... *H04W 52/245* (2013.01); *H04W 52/243* (2013.01); *H04W 52/383* (2013.01); *H04W 72/042* (2013.01)

(58) Field of Classification Search
CPC ............. H04W 52/245; H04W 72/042; H04W 52/383; H04W 72/243

(Continued)

(56) References Cited

U.S. PATENT DOCUMENTS

2013/0064214 A1 3/2013 Patil et al.
2013/0310103 A1 11/2013 Madan et al.
(Continued)

FOREIGN PATENT DOCUMENTS

CN 103596258 A 2/2014
CN 103686976 A 3/2014
(Continued)

OTHER PUBLICATIONS

Nokia, NSN, "Relationship between coverage conditions and D2D operation", 3GPP TSG RAN WG1 Meeting #77, Seoul, South Korea; May 19-May 23, 2014, 5 pgs.

*Primary Examiner* — Nay A Maung
*Assistant Examiner* — Angelica M Perez
(74) *Attorney, Agent, or Firm* — Young Basile Hanlon & MacFarlane, P.C.

(57) ABSTRACT

A power control method and a power control device for terminal device-to-device communications, and a parameter transmission method includes: determining at least one terminal which is outside a base station coverage range and interferes with a base station; acquiring, by the base station, signal strength information about a measurement signal sent by each terminal of the at least one terminal when the measurement signal reaches the base station, and configuring a corresponding power control parameter for each terminal according to the signal strength information; and sending, by the base station, the corresponding power control parameter of each terminal to a synchronization source terminal within the base station coverage range corresponding to each terminal, so as to send the power control parameter to a corresponding terminal by the synchronization source terminal, so that each terminal conducts power control using the corresponding power control parameter.

11 Claims, 5 Drawing Sheets

(58) Field of Classification Search
USPC .......................................................... 455/522
See application file for complete search history.

(56) References Cited

U.S. PATENT DOCUMENTS

2016/0198508 A1* 7/2016 Lee ..................... H04W 76/023
                                                              370/329
2016/0227518 A1* 8/2016 Li ........................ H04W 72/042

FOREIGN PATENT DOCUMENTS

| CN | 103841649 A | 6/2014 |
| WO | 20140054990 A1 | 4/2014 |

* cited by examiner

POWER CONTROL METHOD AND DEVICE, AND PARAMETER TRANSMISSION METHOD

CROSS-REFERENCE TO RELATED APPLICATION(S)

This application is a continuation of PCT/CN2014/083152, filed on Jul. 28, 2014, the content of which is herein incorporated by reference.

TECHNICAL FIELD

The present disclosure relates to the field of terminal technology, and more particularly, to a power control method, a parameter transmission method, and a power control device.

BACKGROUND

Device to Device (D2D) communication refers to a technology through which terminals can communicate directly without the need of forwarding by the network. Because forwarding by base station is not required, a lot of mobile network resources can be saved and the network capacity can be further enhanced.

At the same time, the main working modes of D2D include: point-to-point communication and broadcast communication; currently, 3GPP research topics are dominated by the broadcast communication. The point-to-point communication of D2D is similar to traditional cellular communication. The broadcast communication is composed of one transmitting node and a plurality of receiving nodes, and more than one forwarding may exist during communication. Since multiple receiving nodes are involved in the broadcast communication and channels of the transmitting nodes are independent of each other, maximum power is generally used for transmitting in order to ensure broadcast coverage.

SUMMARY

Based on the above-mentioned problems, the present disclosure provides a new technical scheme, which can conduct power control on an UE that out of coverage of a base station and has interference to the base station, so as to reduce interference on signals received by the base station.

In view of this, according to one aspect of the present disclosure, it is provided a power control method for Device to Device (D2D) communication. The method includes: determining at least one terminal which is outside coverage of a base station and interferes with the base station; acquiring, by the base station, signal strength information of a measurement signal transmitted by each terminal of the at least one terminal when the measurement signal reaches the base station, and configuring, by the base station, a corresponding power control parameter for each terminal according to the signal strength information; transmitting, by the base station, the corresponding power control parameter of each terminal to a synchronous source terminal corresponding to each terminal in the coverage of the base station, whereby the synchronous source terminal can transmit the power control parameter to a corresponding terminal, such that each terminal can conduct power control using the corresponding power control parameter.

In this technical scheme, by acquiring the signal strength information of the measurement signal transmitted by the base station when the measurement signal reaches the base station, parameter information from each terminal to the base station can be obtained, among which the parameter information includes the distance, power consumption and so on from each terminal to the base station; in accordance with the parameter information, suitable power control parameter can be configured for each terminal which is outside coverage of the base station and interferes with the base station, such that the terminal can control the power of the signal transmitted according to the power control parameter, and the transmission distance of a signal transmitted by the terminal can be made as far as possible. In addition, it will not cause interference to signal reception of the base station when the signal transmitted by the terminal passing through the base station.

At the same time, since the terminal interfering with the base station is located out of coverage of the base station, the base station cannot transmit the power control parameter to the target terminal directly; in contrast, the base station has to transmit the power control parameter to a synchronous source terminal of a target terminal, and the power control parameter will be transmitted to the corresponding target terminal by the synchronous source terminal; among which the synchronous source terminal is a terminal in coverage of the base station, and it can perform D2D communication with a terminal which is outside coverage of the base station and interferes with the base station.

The power control parameter includes but not limited to a power threshold and an adjustment parameter.

In the above technical scheme, in the at least one terminal, the parameter corresponding to one terminal can be the same or not the same as power control parameters of other terminals; the measurement signal includes a pilot signal, a reference symbol, and/or signals with a known transmission power.

As one implementation, the base station can allocate the same or different power control parameter for each terminal; if the power control parameter of each terminal is the same, the overhead of control signaling can be reduced; on the other hand, the base station can configure an accurate power control parameter for each terminal in accordance with signal strength information of the measurement signal transmitted by each terminal when the measurement signal reaches the base station, thereby achieving precise control of the transmission power of each terminal. Among which the measurement signal includes the pilot signal, the reference symbol, and/or the signals with a known transmission power. As one implementation, if the power control parameter of each terminal is the same, the base station can transmit a same power control parameter to synchronous source terminals corresponding to each terminal respectively, whereby the synchronous source terminals can transmit the same power control parameter to corresponding terminals respectively.

As can be seen, if the power control parameter of each terminal of the at least one terminal is the same, the base station can transmit the same power control parameter to the synchronous source terminals corresponding to each terminal respectively.

On the other hand, if the power control parameter of one terminal is not the same as the power control parameters of other terminals, the base station can transmit terminal identification information and a corresponding power control parameter of a terminal to a synchronous source terminal corresponding to the terminal, whereby the synchronous source terminal can transmit the power control parameter in accordance with the terminal identification information and the power control parameter.

As can be seen, if the power control parameter of one terminal is not the same as the power control parameters of other terminals, the base station has to transmit the power control parameter along with the terminal identification information of the terminal to the synchronous source terminal of the terminal, whereby the synchronous source terminal can determine the target terminal of the power control parameter.

In the above technical scheme, the base station can configure the power control parameter for each terminal via Radio Resource Control (RRC) signaling, and transmit the power control parameter of each terminal to a corresponding synchronous source terminal of each terminal via Physical Downlink Control Channel (PDCCH).

According to another aspect of the present disclosure, it is provided a parameter transmission method for a terminal, the method includes: upon reception of a power control parameter transmitted from a base station, transmitting the power control parameter to other terminals which are outside coverage of the base station and are provided with a synchronous signal by the terminal, whereby the other terminals can conduct power control using the power control parameter.

In this technical scheme, by providing the terminal which is outside coverage of the base station and interferes with the base station with the power control parameter, the terminal can control the power of the signal transmitted in accordance with the power control parameter, such that the transmission distance of the signal transmitted by the terminal can be made as far as possible; besides, it will not cause interference to signal reception of the base station when the signal transmitted by the terminal passing through the base station.

In the above technical scheme, the method can further include: placing the power control parameter on Physical D2D Shared Channel (PD2DSCH), scheduling signaling, or transmission data by the terminal, so as to transmit the power control parameter to the other terminals.

In this technical scheme, the power control parameter can be transmitted in a variety of ways which including but not limited to the manners described above.

In the above technical scheme, if only one power control parameter is received and no corresponding terminal identification information is received, the power control parameter will be transmitted to each of the others terminals directly.

As can be seen, if only one power control parameter is received and no corresponding terminal identification is received, it means that each terminal of the other terminals corresponds to the same power control parameter; therefore, the terminal can transmit the power control parameter to each of the other terminals directly.

On the other hand, in the above technical scheme, if multiple power control parameters are received and terminal identification information corresponding to each power control parameter is received, each power control parameter will be transmitted to a corresponding terminal of the other terminals in accordance with the terminal identification information corresponding to each power control parameter respectively.

As can be seen, in this technical scheme, if multiple power control parameters as well as terminal identification information corresponding to each power control parameter are received, each power control parameter can be transmitted to a corresponding target terminal in accordance with identification information of each terminal, so as to avoid transmitting erroneous power control parameters to the target terminal.

According to another aspect of the present disclosure, it is provided is power control device for D2D communication. The device includes: a determining unit, configured to determine at least one terminal which is outside coverage of a base station and interferes with the base station; a parameter configuring unit, configured to acquire signal strength information of a measurement signal transmitted by each terminal of the at least one terminal when the measurement signal reaches the base station and configure a corresponding power control parameter for each terminal according to the signal strength information; a transmitting unit, configured to transmit the corresponding power control parameter of each terminal to a synchronous source terminal in coverage of the base station corresponding to each terminal, whereby the synchronous source terminal can transmit the power control parameter to a corresponding terminal, such that each terminal can conduct power control using the corresponding power control parameter.

In this technical scheme, by acquiring the signal strength information of the measurement signal transmitted by the base station when the measurement signal reaches the base station, parameter information from each terminal to the base station can be obtained, among which the parameter information includes the distance, power consumption and so on from each terminal to the base station; in accordance with the parameter information, suitable power control parameter can be configured for a terminal which is outside coverage of the base station and interferes with the base station, such that the terminal can control the power of the signal transmitted according to the power control parameter, and the transmission distance of a signal transmitted by the terminal can be made as far as possible. In addition, it will not cause interference to signal reception of the base station when the signal transmitted by the terminal passing through the base station.

At the same time, since the terminal interfering with the base station is located out of coverage of the base station, the base station cannot transmit the power control parameter to the target terminal directly; in contrast, the base station has to transmit the power control parameter to a synchronous source terminal of a target terminal, and the power control parameter will be transmitted to the corresponding target terminal by the synchronous source terminal; among which the synchronous source terminal is a terminal in coverage of the base station, and it can perform D2D communication with a terminal which is outside coverage of the base station and interferes with the base station.

In the above technical scheme, in the at least one terminal, the parameter corresponding to one terminal can be the same or not the same as power control parameters of other terminals; the measurement signal includes a pilot signal, a reference symbol, and/or other signals with a known transmission power.

As one implementation, the base station can allocate the same or different power control parameter for each terminal; if the power control parameter of each terminal is the same, the overhead of control signaling can be reduced; on the other hand, the base station can configure an accurate power control parameter for each terminal in accordance with signal strength information of the measurement signal transmitted by each terminal when the measurement signal reaches the base station, thereby achieving precise control of the transmission power of each terminal. Among which the measurement signal includes the pilot signal, the reference symbol, and/or the signals with a known transmission power.

In the above technical scheme, as one implementation, the transmitting unit is configured to: transmit directly a same power control parameter to synchronous source terminals corresponding to each terminal respectively if the power control parameter of each terminal is the same, whereby the synchronous source terminals can transmit the same power control parameter to corresponding terminals respectively.

As can be seen, if the power control parameter of each terminal of the at least one terminal is the same, the base station can transmit the same power control parameter to the synchronous source terminals corresponding to each terminal respectively.

As one implementation, the transmitting unit is further configured to: transmit terminal identification information and a corresponding power control parameter of a terminal to a synchronous source terminal corresponding to the terminal if the power control parameter of one terminal is not the same as the power control parameters of other terminals, whereby the synchronous source terminal can transmit the power control parameter in accordance with the terminal identification information and the power control parameter.

As can be seen, if the power control parameter of one terminal is not the same as the power control parameters of other terminals, the power control parameter will be transmitted to the synchronous source terminal of the terminal along with the terminal identification information of the terminal, whereby the synchronous source terminal can determine the target terminal of the power control parameter.

In the above technical scheme, the parameter configuring unit can configure the power control parameter for each terminal via Radio Resource Control (RRC) signaling, and the transmitting unit can transmit the power control parameter of each terminal to a corresponding synchronous source terminal of each terminal via Physical Downlink Control Channel (PDCCH).

According to another aspect of the present disclosure, it is provided a base station including the power control device according to any aspect described above of the present disclosure.

According to another aspect of the present disclosure, it is provided a parameter transmission device for a terminal. The parameter transmission device includes: an interaction unit, configured to transmit a power control parameter to other terminals which are outside coverage of a base station and are provided with a synchronous signal by the terminal upon reception of the power control parameter transmitted from the base station, whereby the other terminals can conduct power control using the power control parameter.

In this technical scheme, by providing the terminal which is outside coverage of the base station and interferes with the base station with the power control parameter, the terminal can control the power of the signal transmitted in accordance with the power control parameter, such that the transmission distance of the signal transmitted by the terminal can be made as far as possible; besides, it will not cause interference to signal reception of the base station when the signal transmitted by the terminal passing through the base station.

In the above technical scheme, the interaction unit is further configured to place the power control parameter on Physical D2D Shared Channel (PD2DSCH), scheduling signaling, or transmission data, such that the power control parameter can be transmitted to the other terminals.

In this technical scheme, the power control parameter can be transmitted in a variety of ways which including but not limited to the manners described above.

In the above technical scheme, the interaction unit is further configured to transmit the power control parameter directly to each of the others terminals, if only one power control parameter is received and no corresponding terminal identification information is received.

As can be seen, if only one power control parameter is received and no corresponding terminal identification is received, it means that each terminal of the other terminals corresponds to the same power control parameter; therefore, the interaction unit can transmit the power control parameter to each of the other terminals directly.

In the above technical scheme, the interaction unit is further configured to transmit each power control parameter to a corresponding terminal of the other terminals in accordance with terminal identification information corresponding to each power control parameter respectively, if multiple power control parameters are received and the terminal identification information corresponding to each power control parameter is received.

As can be seen, in this technical scheme, if multiple power control parameters as well as terminal identification information corresponding to each power control parameter are received, each power control parameter can be transmitted to a corresponding target terminal in accordance with identification information of each terminal, so as to avoid transmitting erroneous power control parameters to the target terminal.

According to another aspect of the present disclosure, it is provided a terminal including the parameter transmission device according to any aspect described above of the present disclosure.

With aid of the above technical schemes, it is possible to conduct power control on user equipment that out of coverage of a base station and interferes with the base station so as to reduce interference on terminals in coverage of the base station.

DETAILED DESCRIPTION

In the discussion of 3GPP, currently there are two resource allocation modes.

Mode 1: The communication transmission resource of D2D user equipment (UE) is directly scheduled by the network (base station, BS).

Mode 2: The D2D UE autonomously selects the communication transmission resource in a preset resource pool.

Different designs are made with regard to in-coverage D2D UE and out-of-coverage D2D UE.

In-coverage: In order to reduce the impact on the Long Term Evolution (LTE) network and ensure the reliability of transmission, usually, the base station can allocate resources directly (Mode 1) or designate a resource pool for the terminal to choose resources there from for communication (Mode 2).

Out-of-coverage: Mode 2 is usually adopted for communication because there is no base station.

Since a D2D signal and a LTE signal are transmitted on adjacent resource blocks of the same frequency band and the power of the D2D signal is much higher than a power controlled LTE signal, thus result in large interference on the LTE signal. To this end, a technical solution is introduced currently, which can control the power of the D2D signal and therefore, large interference on the LTE signal caused by the transmission power of the D2D signal can be reduced.

The current power control method is mainly configured for a situation where Mode 1 is adopted to acquire resources for allocation, and power control parameters P0 and alpha are configured for UE by the base station. This method follows the traditional LTE power control approach; the power control of a connected UE is performed by the base station, and it is possible to satisfactorily solve the problem of interference on the LTE signal caused by the in-coverage UE in Mode 1; however, this method cannot solve the problem of interference on the LTE signal caused by the out-of-coverage UE.

Figure 1:
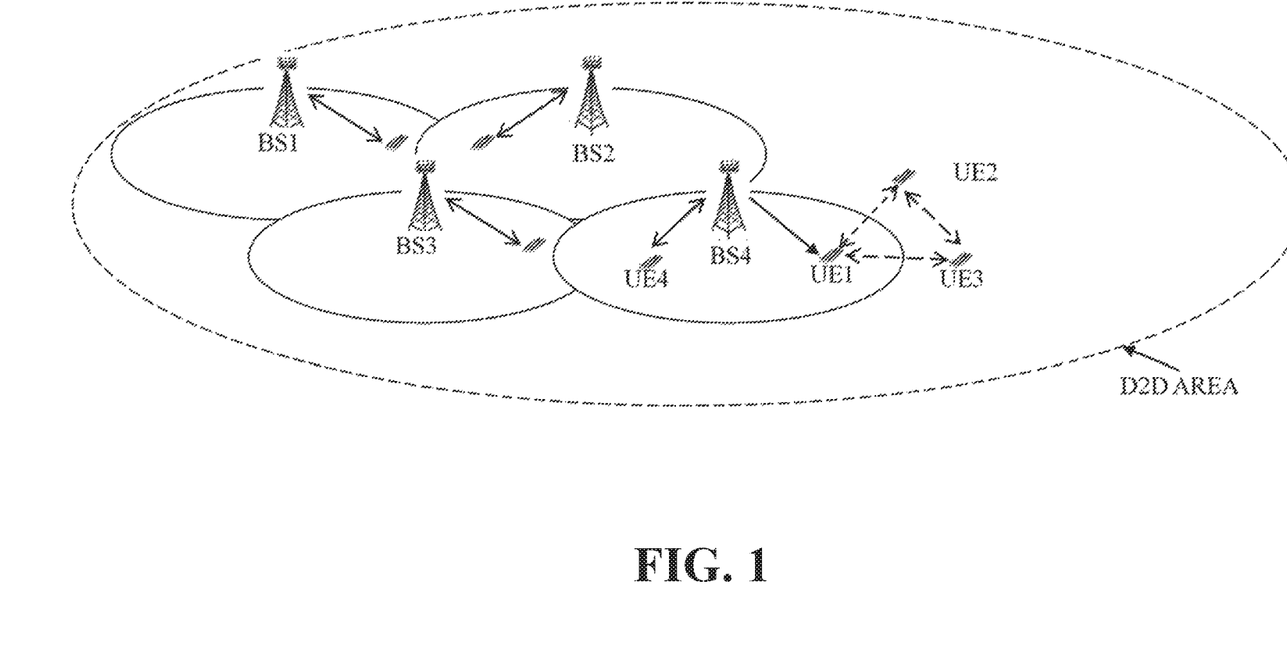
FIG. 1 is a schematic diagram illustrating a relationship between terminals out of coverage of a base station and a base station.

As shown in FIG. 1, the dotted large circle is the D2D communication area, which is larger than the base station coverage of solid lines. UE1, UE2, and UE3 are D2D communication terminals, in which UE2 and UE3 are out of coverage. Transmission signals of UE2 and UE3, if not power controlled (full power transmission), may interfere with BS4 for receiving UL signals of UE4. Therefore, UE 2 and UE 3 need to modulate the transmission power via power control so as to reduce the influence on the LTE UE. Objects of the power control of UE2 and UE3 are as follows: transmit signals with a power as large as possible without interfering with a BS for receiving signals of the LTE UE, so as to obtain a greater coverage. However, since UE2 and UE3 are out of coverage of the network, suitable power control parameters P0 and alpha cannot be configured by the base station. Therefore, UE2 and UE3 cannot perform accurate power control.

Therefore, it is important to conduct power control on terminals out of coverage of the base station so as to reduce the impact on the base station.

In order to provide a clearer understanding of the above objects, features, and advantages of the present disclosure, it will now be described in further detail with reference to the accompanying drawings and specific implementations. It should be noted that, features of implementations and the implementations of the present disclosure can be combined with one another without conflict.

In the following description, numerous specific details are set forth in order to facilitate a thorough understanding of the present disclosure, however, the present disclosure can be practiced otherwise than as specifically described herein and therefore, the scope of the present disclosure is not to be limited by the specific implementations disclosed below.

Figure 2:
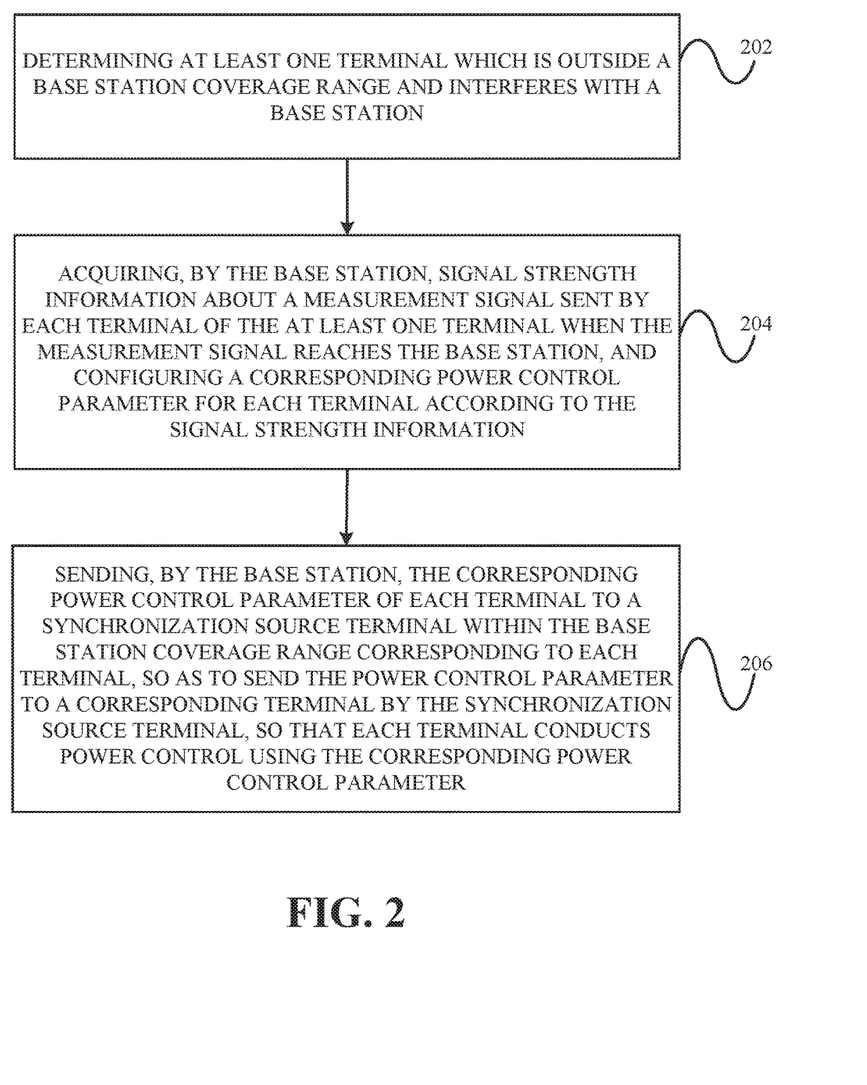
FIG. 2 is a schematic flow diagram illustrating a power control method for D2D communication according to an implementation of the present disclosure.

FIG. 2 is a schematic flow diagram illustrating a power control method for D2D communication according to an implementation of the present disclosure.

As shown in FIG. 2, the power control method for D2D communication according the implementation of the present disclosure includes: step 202, determining at least one terminal which is outside coverage of a base station and interferes with the base station; step 204, acquiring, by the base station, signal strength information of a measurement signal transmitted by each terminal of the at least one terminal when the measurement signal reaches the base station, and configuring, by the base station, a corresponding power control parameter for each terminal according to the signal strength information; step 206, transmitting, by the base station, the corresponding power control parameter of each terminal to a synchronous source terminal in coverage of the base station corresponding to each terminal, whereby the synchronous source terminal can transmit the power control parameter to a corresponding terminal, such that each terminal can conduct power control using the corresponding power control parameters.

In this technical scheme, by acquiring the signal strength information of the measurement signal transmitted by each terminal when the measurement signal reaches the base station, parameter information from each terminal to the base station can be obtained, among which the parameter information includes the distance, power consumption and so on from each terminal to the base station; in accordance with the parameter information, suitable power control parameter can be configured for a terminal which is outside coverage of the base station and interferes with the base station, such that the terminal can control the power of the signal transmitted according to the power control parameter, and the transmission distance of a signal transmitted by the terminal can be made as far as possible. In addition, it will not cause interference to signal reception of the base station when the signal transmitted by the terminal passing through the base station.

At the same time, since the terminal interfering with the base station is located out of coverage of the base station, the base station cannot transmit the power control parameter to the target terminal directly; in contrast, the base station has to transmit the power control parameter to a synchronous source terminal of a target terminal, and the power control parameter will be transmitted to the corresponding target terminal by the synchronous source terminal; among which the synchronous source terminal is a terminal in coverage of the base station, and it can perform D2D communication with a terminal which is outside coverage of the base station and interferes with the base station.

In the above technical scheme, in the at least one terminal, the parameter corresponding to each terminal (that is, any one of the at least one terminal) can be the same or not the same as power control parameters of other terminals; the measurement signal includes a pilot signal, a reference symbol, and/or signals with a known transmission power.

As one implementation, the base station can allocate the same or different power control parameter for each terminal; if the power control parameter of each terminal is the same, the overhead of control signaling can be reduced; on the other hand, the base station can configure an accurate power control parameter for each terminal in accordance with signal strength information of the measurement signal transmitted by each terminal when the measurement signal reaches the base station, thereby achieving precise control of the transmission power of each terminal. Among which the measurement signal includes the pilot signal, the reference symbol, and/or the signals with a known transmission power.

In the implementation, as one implementation, if the power control parameter of each terminal is the same, the base station can transmit a same power control parameter to synchronous source terminals corresponding to each terminal respectively, whereby the synchronous source terminals can transmit the sane power control parameter to corresponding terminals respectively.

As can be seen, if the power control parameter of each terminal of the at least one terminal is the same, the base station can transmit the same power control parameter to the synchronous source terminals corresponding to each terminal respectively.

On the other hand, if the power control parameter of one terminal is not the same as the power control parameters of other terminals, the base station can transmit terminal identification information and a corresponding power control parameter of a terminal to a synchronous source terminal corresponding to the terminal, whereby the synchronous source terminal can transmit the power control parameter in accordance with the terminal identification information and the power control parameter.

As can be seen, if the power control parameter of one terminal is not the same as the power control parameters of other terminals, the base station has to transmit the power control parameter along with the terminal identification information of the terminal to the synchronous source terminal of the terminal, whereby the synchronous source terminal can determine the target terminal of the power control parameter.

In the above technical scheme, the base station can configure the power control parameter for each terminal via Radio Resource Control (RRC) signaling, and transmit the power control parameter of each terminal to a corresponding synchronous source terminal of each terminal via Physical Downlink Control Channel (PDCCH).

Figure 3:
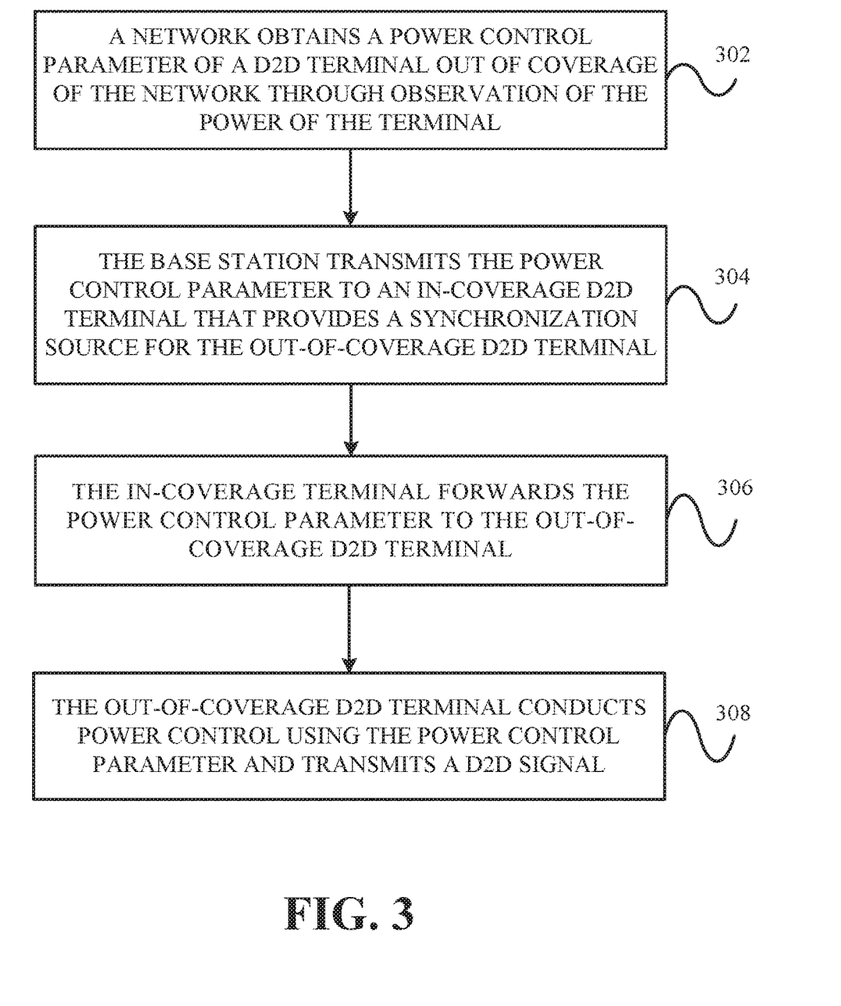
FIG. 3 is a schematic flow diagram illustrating a power control method for D2D communication according to another implementation of the present disclosure.

FIG. 3 is a schematic flow diagram illustrating a power control method for D2D communication according to another implementation of the present disclosure.

As shown in FIG. 3, the power control method for D2D communication according to another implementation of the present disclosure includes the following steps.

Step 302, a network (base station) obtains a power control parameter of a D2D terminal out of coverage of the network through observation of the power of the terminal. By measuring a synchronization signal (D2DSS/PD2DSCH), and/or a discovery signal, and/or a communication signal of the out-of-coverage D2D terminal (take UE2 and UE3 as an example), the base station can obtain the signal strength of the D2D terminal when the signal reaches the base station and generate the power control parameter (including but not limited to a power threshold P0 and an adjustment parameter alpha) accordingly, whereby the out-of-coverage D2D terminal will not interfere with the base station for receiving a UL signal transmitted by an in-coverage terminal. In addition, power control parameters of all out-of-coverage terminals can be configured to be the same by the base station so as to reduce the overhead of a control signaling; on the other hand, the base station can set corresponding power control parameter for different out-of-coverage D2D terminal respectively, so as to control interference more precisely.

Step 304, the base station configures the power control parameter for an in-coverage D2D terminal that provides a synchronization source for the out-of-coverage D2D terminal (that is, UE2 and UE3); the configuration method can be as follows: the base station configures the power control parameter via RRC signaling and transmits the power control parameter to an in-coverage synchronization source D2D terminal via PDCCH and at the same time, the synchronization source terminal can transmit the power control parameter to the out-of-coverage terminal. If this power control parameter is the same for all of the terminals, there is no need to indicate a target terminal when configuring the signaling; otherwise, if the power control parameter is UE-specific, the identification of a D2D terminal corresponding to the power control parameter has to be indicated in the signaling.

Step 306, the in-coverage terminal forwards the power control parameter to an out-of-coverage terminal. If the power control parameter is the same for all the terminals, the in-coverage terminal can forward the power control parameter to the out-of-coverage terminal directly; otherwise, if the power control parameter is US-specific, the power control parameter has to be forwarded along with the identification of a corresponding terminal; besides, when forwarding, the power control parameter can be placed in PD2DSCH, scheduling signaling (SA), or data.

Step 308, the out-of-coverage D2D terminal can use the power control parameter to conduct power control and transmit D2D signal.

If the power control parameter is UE-common, then after receiving the power control parameter, the out-of-coverage D2D terminal can forward the power control parameter; of course, the out-of-coverage D2D terminal can choose not to forward the power control parameter. If the control terminal is UE-specific and the parameter of a D2D terminal communicating with the out-of-coverage D2D is not included, the power control parameter will not be forwarded so as to save the overhead of signaling.

Figure 4:
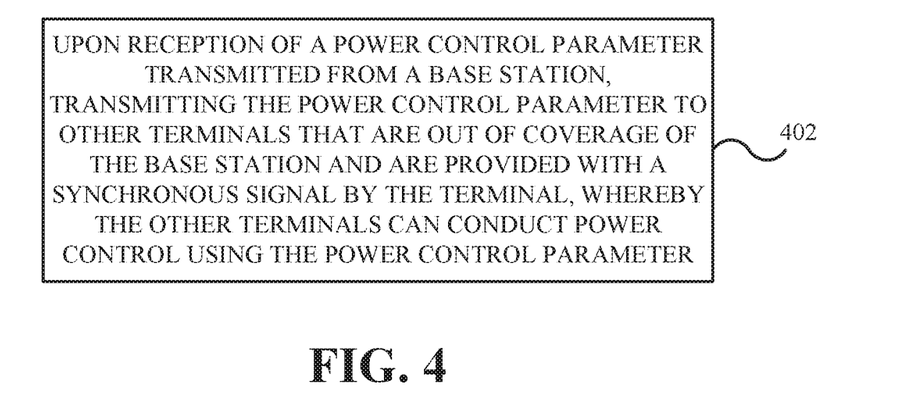
FIG. 4 is a schematic flow diagram illustrating a parameter transmission method according to an implementation of the present disclosure.

FIG. 4 is a schematic flow diagram illustrating a parameter transmission method according to an implementation of the present disclosure.

As shown in FIG. 4, the parameter transmission method according to the implementation of the present disclosure includes: step 402, upon reception of a power control parameter transmitted from a base station, transmitting the power control parameter to other terminals which are outside coverage of the base station and are provided with a synchronous signal by the terminal, whereby the other terminals can conduct power control using the power control parameter.

In this technical scheme, by providing the terminal which is outside coverage of the base station and interferes with the base station with the power control parameter, the terminal can control the power of the signal transmitted in accordance with the power control parameter, such that the transmission distance of the signal transmitted by the terminal can be made as far as possible; besides, it will not cause interference to signal reception of the base station when the signal transmitted by the terminal passing through the base station.

In the above technical scheme, the method can further include: placing the power control parameter on Physical D2D Shared Channel (PD2DSCH), scheduling signaling, or transmission data, so as to transmit the power control parameter to the other terminals.

In this technical scheme, the power control parameter can be transmitted in a variety of ways which including but not limited to the manners described above.

In the above technical scheme, if only one power control parameter is received and no corresponding terminal identification information is received, the power control parameter will be transmitted to each of the others terminals directly.

As can be seen, if only one power control parameter is received and no corresponding terminal identification is received, it means that each terminal of the other terminals corresponds to the same power control parameter; therefore, the terminal can transmit the power control parameter to each of the other terminals directly.

On the other hand, in the above technical scheme, if multiple power control parameters are received and terminal identification information corresponding to each power control parameter is received, each power control parameter will be transmitted to a corresponding terminal of the other terminals in accordance with the terminal identification information corresponding to each power control parameter respectively.

As can be seen, in this technical scheme, if multiple power control parameters as well as terminal identification information corresponding to each power control parameter are received, each power control parameter can be transmitted to a corresponding target terminal in accordance with identification information of each terminal, so as to avoid transmitting erroneous power control parameters to the target terminal.

Figure 5:
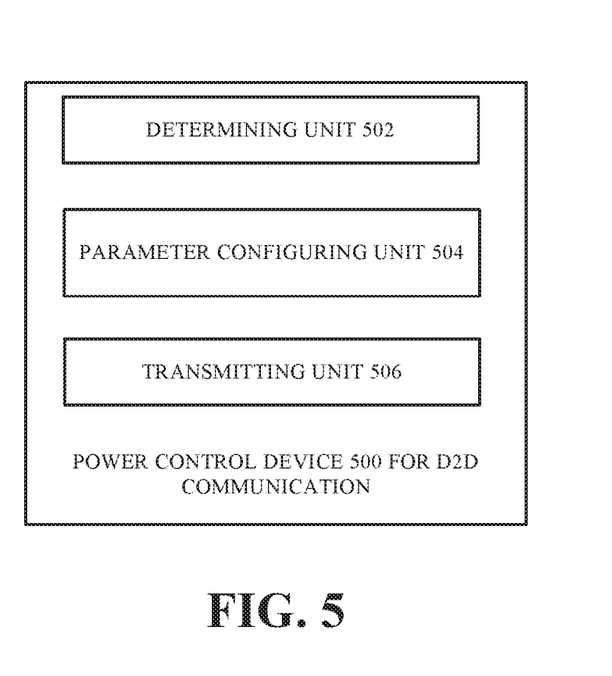
FIG. 5 is a structural diagram illustrating a power control device for D2D communication according to an implementation of the present disclosure.

FIG. 5 is a structural diagram illustrating a power control device for D2D communication according to an implementation of the present disclosure.

As shown in FIG. 5, a power control device 500 for D2D communication includes: a determining unit 502, configured to determine at least one terminal which is outside coverage of a base station and interferes with the base station; a parameter configuring unit 504, configured to acquire signal strength information of a measurement signal transmitted by each terminal of the at least one terminal when the measurement signal reaches the base station and configure a corresponding power control parameter for each terminal according to the signal strength information; a transmitting unit 506, configured to transmit the corresponding power control parameter of each terminal to a synchronous source terminal in coverage of the base station corresponding to each terminal, whereby the synchronous source terminal can transmit the power control parameter to a corresponding terminal, such that each terminal can conduct power control using the corresponding power control parameter.

In this technical scheme, by acquiring the signal strength information of the measurement signal transmitted by the base station when the measurement signal reaches the base station, parameter information from each terminal to the base station can be obtained, among which the parameter information includes the distance, power consumption and so on from each terminal to the base station; in accordance with the parameter information, suitable power control parameter can be configured for terminal which is outside coverage of the base station and interferes with the base station, such that the terminal can control the power of the signal transmitted according to the power control parameter, and the transmission distance of a signal transmitted by the terminal can be made as far as possible. In addition, it will not cause interference to signal reception of the base station when the signal transmitted by the terminal passing through the base station.

At the same time, since the terminal interfering with the base station is located out of coverage of the base station, the base station cannot transmit the power control parameter to the target terminal directly; in contrast, the base station has to transmit the power control parameter to a synchronous source terminal of a target terminal, and the power control parameter will be transmitted to the corresponding target terminal by the synchronous source terminal; among which the synchronous source terminal is a terminal in coverage of the base station, and it can perform D2D communication with a terminal which is outside coverage of the base station and interferes with the base station.

In the above technical scheme, in the at least one terminal, the parameter corresponding to one terminal can be the same or not the same as power control parameters of other terminals; the measurement signal includes a pilot signal, a reference symbol, and/or other signals with a known transmission power.

As one implementation, the base station can allocate the same or different power control parameter for each terminal; if the power control parameter of each terminal is the same, the overhead of control signaling can be reduced; on the other hand, the base station can configure an accurate power control parameter for each terminal in accordance with signal strength information of the measurement signal transmitted by each terminal when the measurement signal reaches the base station, thereby achieving precise control of the transmission power of each terminal. Among which the measurement signal includes the pilot signal, the reference symbol, and/or the signals with a known transmission power.

In the above technical scheme, as one implementation, the transmitting unit 506 is configured to: transmit a same power control parameter to synchronous source terminals corresponding to each terminal respectively if the power control parameter of each terminal is the same, whereby the synchronous source terminals can transmit the same power control parameter to corresponding terminals respectively.

As can be seen, if the power control parameters of each terminal of the at least one terminal is the same, the base station can transmit the same power control parameter to the synchronous source terminals corresponding to each terminal respectively.

As one implementation, the transmitting unit 506 is further configured to: transmit terminal identification information and a corresponding power control parameter of a terminal to a synchronous source terminal corresponding to the terminal if the power control parameter of one terminal is not the same as the power control parameters of other terminals, whereby the synchronous source terminal can transmit the power control parameter in accordance with the terminal identification information and the power control parameter.

As can be seen, if the power control parameter of one terminal is not the same as the power control parameters of other terminals, the power control parameter will be transmitted to the synchronous source terminal of the terminal along with the terminal identification information of the terminal, whereby the synchronous source terminal can determine the target terminal of the power control parameter.

In the above technical scheme, the parameter configuring unit 504 can configure the power control parameter for each terminal via Radio Resource Control (RRC) signaling, and the transmitting unit 506 can transmit the power control parameter of each terminal to a corresponding synchronous source terminal of each terminal via Physical Downlink Control Channel (PDCCH).

Figure 6:
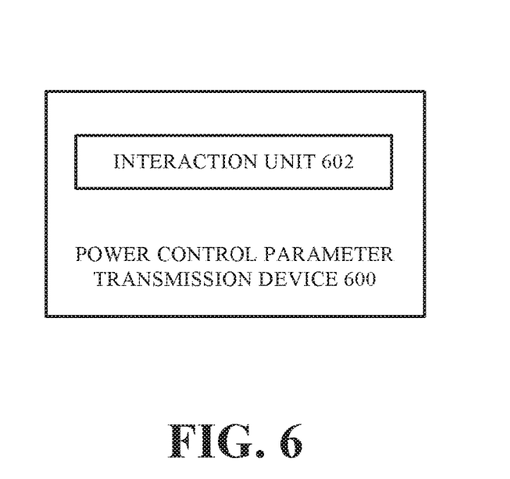
FIG. 6 is a structural diagram illustrating a parameter transmission device according to an implementation of the present disclosure.

FIG. 6 is a structural diagram illustrating a parameter transmission device according to an implementation of the present disclosure.

As shown in FIG. 6, a parameter transmission device 600 according to the implementation of the present disclosure includes: an interaction unit 602, configured to transmit a power control parameter to other terminals which are outside coverage of a base station and are provided with a synchronous signal by the terminal upon reception of the power control parameter transmitted from the base station, whereby the other terminals can conduct power control using the power control parameter.

In this technical scheme, by providing the terminal which is outside coverage of the base station and interferes with the base station with the power control parameter, the terminal can control the power of the signal transmitted in accordance with the power control parameter, such that the transmission distance of the signal transmitted by the terminal can be made as far as possible; besides, it will not cause interference to signal reception of the base station when the signal transmitted by the terminal passing through the base station.

In the above technical scheme, the interaction unit 602 is further configured to place the power control parameter on Physical D2D Shared Channel (PD2DSCH), scheduling signaling, or transmission data, such that the power control parameter can be transmitted to the other terminals.

In this technical scheme, the power control parameter can be transmitted in a variety of ways which including but not limited to the manners described above.

In the above technical scheme, the interaction unit is further configured to transmit the power control parameter directly to each of the others terminals, if only one power control parameter is received and no corresponding terminal identification information is received.

As can be seen, if only one power control parameter is received and no corresponding terminal identification is received, it means that each terminal of the other terminals corresponds to the same power control parameter; therefore, the interaction unit can transmit the power control parameter to each of the other terminals directly.

In the above technical scheme, the interaction unit 602 is further configured to transmit each power control parameter to a corresponding terminal of the other terminals in accordance with terminal identification information corresponding to each power control parameter respectively, if multiple power control parameters are received and the terminal identification information corresponding to each power control parameter is received.

As can be seen, in this technical scheme, if multiple power control parameters as well as terminal identification information corresponding to each power control parameter are received, each power control parameter can be transmitted to a corresponding target terminal in accordance with identification information of each terminal, so as to avoid transmitting erroneous power control parameters to the target terminal.

Technical schemes of the present disclosure have been disclosed with reference to accompanying drawings; with aid of the above technical schemes, it is possible to conduct power control on user equipment that out of coverage of a base station and interferes with the base station so as to reduce interference on terminals in coverage of the base station.

Figure 7:
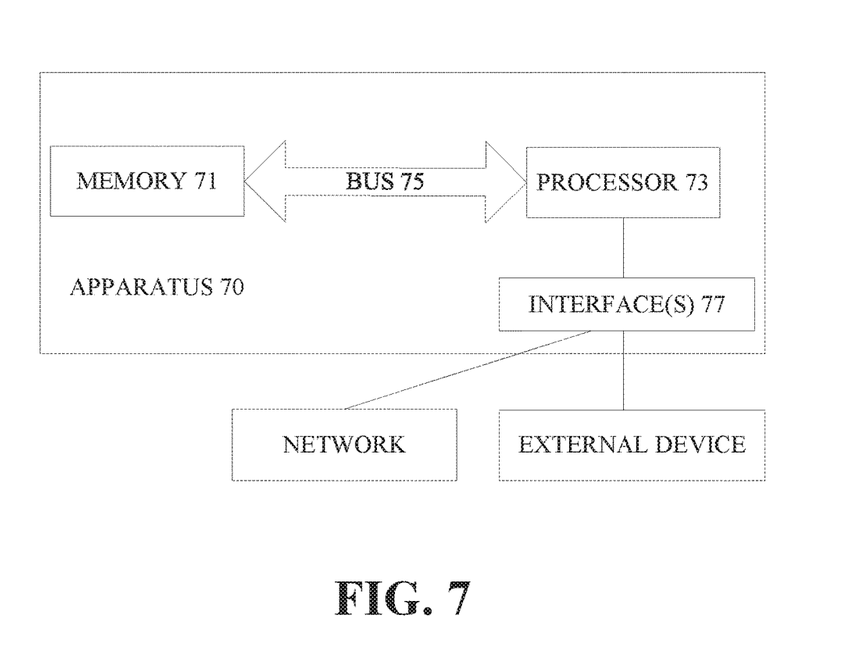
FIG. 7 is a block diagram illustrating an apparatus according to an implementation of the present disclosure.

According to an implementation of the present disclosure, it is provided an apparatus, and FIG. 7 is a block diagram illustrating the apparatus. As illustrated in FIG. 7, the apparatus 70 includes a memory 71 and at least one processor 73 (for clarity, only one is illustrated in the figure). The memory 71 and the processor 73 can be connected in a wired or wireless manner, for example, through a bus 75. For example, the apparatus 70 of the implementation can be a server or a terminal, or can be equipment that is able to be arranged in a terminal, a server, or the network registration device described above.

To be specific, the memory 71 is configured to store computer-readable program code, and can be ROM, RAM, CD-RAM, or any other removable storage medium; the processor 73 is configured to invoke the computer-readable program code stored in the memory 71 to execute predetermined process such as the methods according to the implementations of the present disclosure described above, or to run elements, units, or modules included in the power control device according to the implementations of the present disclosure, to avoid unnecessarily obscuring the present disclosure, details of the power control method and device, the parameter transmission method, such as the steps and the structure, are not provided here.

In addition, as shown in FIG. 7, the processor 73 can but not necessarily connect to an external device or network through an interface 77.

According to an implementation of the present disclosure, it is provided a program product stored in a non-volatile machine-readable media for power control of D2D communication. The program product includes machine executable instructions configured to cause a computer system to perform the following steps: determining at least one terminal which is outside coverage of a base station and interferes with the base station; acquiring signal strength information of a measurement signal transmitted by each terminal of the at least one terminal when the measurement signal reaches the base station and configuring a corresponding power control parameter for each terminal according to the signal strength information by the base station; transmitting the corresponding power control parameter of each terminal to a synchronous source terminal in coverage of the base station corresponding to each terminal by the base station, whereby the synchronous source terminal can transmit the power control parameter to a corresponding terminal, such that each terminal can conduct power control using the corresponding power control parameter.

According to an implementation of the present disclosure, it is provided a non-volatile machine-readable media storing a program product for power control of D2D communication. The program product includes machine executable instructions configured to cause a computer system to perform the following steps: determining at least one terminal which is outside coverage of a base station and interferes with the base station; acquiring signal strength information of a measurement signal transmitted by each terminal of the at least one terminal when the measurement signal reaches the base station and configuring a corresponding power control parameter for each terminal according to the signal strength information by the base station; transmitting the corresponding power control parameter of each terminal to a synchronous source terminal in coverage of the base station corresponding to each terminal by the base station, whereby the synchronous source terminal can transmit the power control parameter to a corresponding terminal, such that each terminal can conduct power control using the corresponding power control parameter.

According to an implementation of the present disclosure, it is provided a computer readable program configured to cause a machine to perform the power control method for D2D communication according to any of the implementations.

According to an implementation of the present disclosure, it is provided a storage medium storing machine readable program, wherein the machine readable program can cause a machine to perform the power control method for D2D communication according to any of the implementations.

According to an implementation of the present disclosure, it is provided a program product stored in a non-volatile machine-readable media. The program product is used for parameter transmission and includes machine executable instructions configured to cause a computer system to perform the following steps: upon reception of a power control parameter transmitted from a base station, transmitting the power control parameter to other terminals which are outside coverage of the base station and are provided with a synchronous signal by the terminal, whereby the other terminals can conduct power control using the power control parameter.

According to an implementation of the present disclosure, it is provided a non-volatile machine-readable media storing a program product for parameter transmission, the program product includes machine executable instructions configured to cause a computer system to perform the following steps: upon reception of a power control parameter transmitted from a base station, transmitting the power control parameter to other terminals which are outside coverage of the base station and are provided with a synchronous signal by the terminal, whereby the other terminals can conduct power control using the power control parameter.

According to an implementation of the present disclosure, it is provided a computer readable program configured to cause a machine to perform the parameter transmission method for D2D communication according to any of the implementations of the present disclosure.

According to an implementation of the present disclosure, it is provided a storage medium storing machine readable program configured to cause a machine to perform the parameter transmission method according to any of the implementations of the present disclosure.

The foregoing is only exemplary implementations of the present disclosure and is not intended to limit the present disclosure. The disclosure is susceptible to various modifications and changes as will occur to those skilled in the art. Any modifications, equivalents, improvements, and the like which fall within the spirit and principles of the present disclosure are intended to be included within the scope of the present disclosure.

What is claimed is:

1. A method of power control for device-to-device communication, comprising:
    determining at least two terminals which are outside of coverage of a base station and interfere with the base station;
    acquiring, by the base station, signal strength information of a measurement signal transmitted by each terminal of the at least two terminals when the measurement signal reaches the base station;
    in response to a determination that respective power control parameters for each terminal of the at least two terminals are the same, configuring, by the base station, a first power control parameter corresponding to the respective power control parameters and transmitting, by the base station, the first power control parameter to a corresponding synchronous source terminal in the coverage of the base station, wherein the corresponding synchronous source terminal transmits the first power control parameter to each of the at least two terminals, such that each of the at least two terminals conduct power control using the first power control parameter; and
    in response to a determination that a power control parameter for at least one terminal of the at least two terminals is different from respective power control parameters of the other terminals of the at least two terminals, configuring, by the base station, a second power control parameter corresponding to the power control parameter of the at least one terminal of the at least two terminals and transmitting, by the base station, the second power control parameter to the corresponding synchronous source terminal, wherein the corresponding synchronous source terminal transmits the second power control parameter to the at least one terminal of the at least two terminals and transmits the first power control parameter to the other terminals of the at least two terminals, such that the at least one terminal of the at least two terminals conducts power using the second power control parameter and the other terminals of the at least two terminals conduct power using the first power control parameter.

2. The method of claim 1, wherein the measurement signal comprises at least one of a pilot signal, a reference symbol, and signals with known transmission power.

3. The method of claim 1, wherein transmitting, by the base station, the first power control parameter to a corresponding synchronous source terminal in the coverage of the base station in response to a determination that the respective power control parameters for each terminal of the at least two terminals are the same comprises:
    transmitting, by the base station, the first power control parameter to each corresponding synchronous source terminal corresponding to each terminal of the at least two terminals directly, wherein the synchronous source terminal transmit the first power control parameter to each corresponding terminal of the at least two terminals, respectively.

4. The method of claim 3, wherein the base station configures the first power control parameter via Radio Resource Control (RRC) signaling, and transmits the first power control parameter to the corresponding synchronous source terminal via Physical Downlink Control Channel (PDCCH).

5. The method of claim 1, wherein, for the at least one terminal of the at least two terminals, the base station configures the second power control parameter via Radio Resource Control (RRC) signaling, and transmits the second power control parameter to the synchronous source terminal corresponding to the at least one terminal of the at least two terminals via Physical Downlink Control Channel (PDCCH).

6. A method of parameter transmission for a terminal, comprising:
    receiving, from a base station, a first power control parameter transmitted corresponding to at least some terminals of a plurality of terminals outside of coverage of a base station and a second power control parameter corresponding to at least one terminal of the plurality of terminals outside of coverage of the base station;
    determining whether terminal identification information corresponding to the first power control parameter and terminal identification information corresponding to the second power control parameter have been received; and
    transmitting, in response to determining that terminal identification information corresponding to the first power control parameter and terminal identification information corresponding to the second power control parameter have been received, the first power control parameter to the at least some terminals of the plurality of terminals outside of coverage of the base station and provide with a synchronous signal by the terminal and the second power control parameter to the at least one terminal of the plurality of terminals outside of the coverage of the base station and provided with the synchronous signal by the terminal, wherein the at least some terminals of the plurality of terminals conduct power control using the first power control parameter and the at least one terminal of the plurality of terminals conducts power control using the second power control parameter.

7. The method of claim 6, further comprising:
placing at least one of the first and second power control parameters on any of Physical D2D Shared Channel (PD2DSCH), scheduling signaling, and transmission data transmitted by the terminal to transmit the at least one of the first and second power control parameters to the plurality of terminals.

8. A device of power control for device-to-device communication, comprising:
at least one processor;
a memory storing program codes, when executed by the at least one processor, adapted to cause the at least one processor to:
determine at least two terminals which are outside of coverage of a base station and interfere with the base station;
acquire, for each terminal of the at least two terminals, signal strength information of a measurement signal transmitted by each terminal of the at least two terminals when the measurement signal reaches the base station;
in response to a determination that respective power control parameters for each terminal of the at least two terminals are the same, configure a first power control parameter corresponding to the respective power control parameters and transmit the first power control parameter to a corresponding synchronous source terminal in the coverage of the base station, wherein each corresponding synchronous source terminal transmits the first power control parameter to each of the at least two terminals, such that each terminal of the at least two terminals conducts power control using the first power control parameter; and
in response to a determination that a power control parameter for at least one terminal of the at least two terminals is different from respective power control parameters of the other terminals of the at least two terminals, configure a second power control parameter corresponding to the power control parameter of the at least one terminal of the at least two terminals and transmit the second power control parameter to the corresponding synchronous source terminal, wherein the corresponding synchronous source terminal transmits the second power control parameter to the at least one terminal of the at least two terminals and transmits the first power control parameter to the other terminals of the at least two terminals, such that the at least one terminal of the at least two terminals conducts power using the second power control parameter and the other terminals of the at least two terminals conduct power using the first power control parameter.

9. The device of claim 8, wherein the measurement signal comprises at least one of a pilot signal, a reference symbol, and signals with known transmission power.

10. The device of claim 8, wherein the program codes to transmit the first power control parameter to a corresponding synchronous source terminal in the coverage of the base station in response to determining that the respective power control parameters for each terminal of the at least two terminals are the same comprise -further program codes performed by the at least one processor to:
transmit, the first power control parameter to each corresponding synchronous source terminal corresponding to each terminal of the at least two terminals directly, wherein the synchronous source terminals transmit the first power control parameter to each corresponding terminal of the at least two terminals, respectively.

11. The device of claim 8, wherein the memory comprises further program codes performed by the at least one processor to configure, for each terminal of the at least two terminals, the first power control parameter via Radio Resource Control (RRC) signaling, and transmit the first power control parameter to each corresponding synchronous source terminal via Physical Downlink Control Channel (PDCCH).

* * * * *